No. 774,105. Patented November 1, 1904.

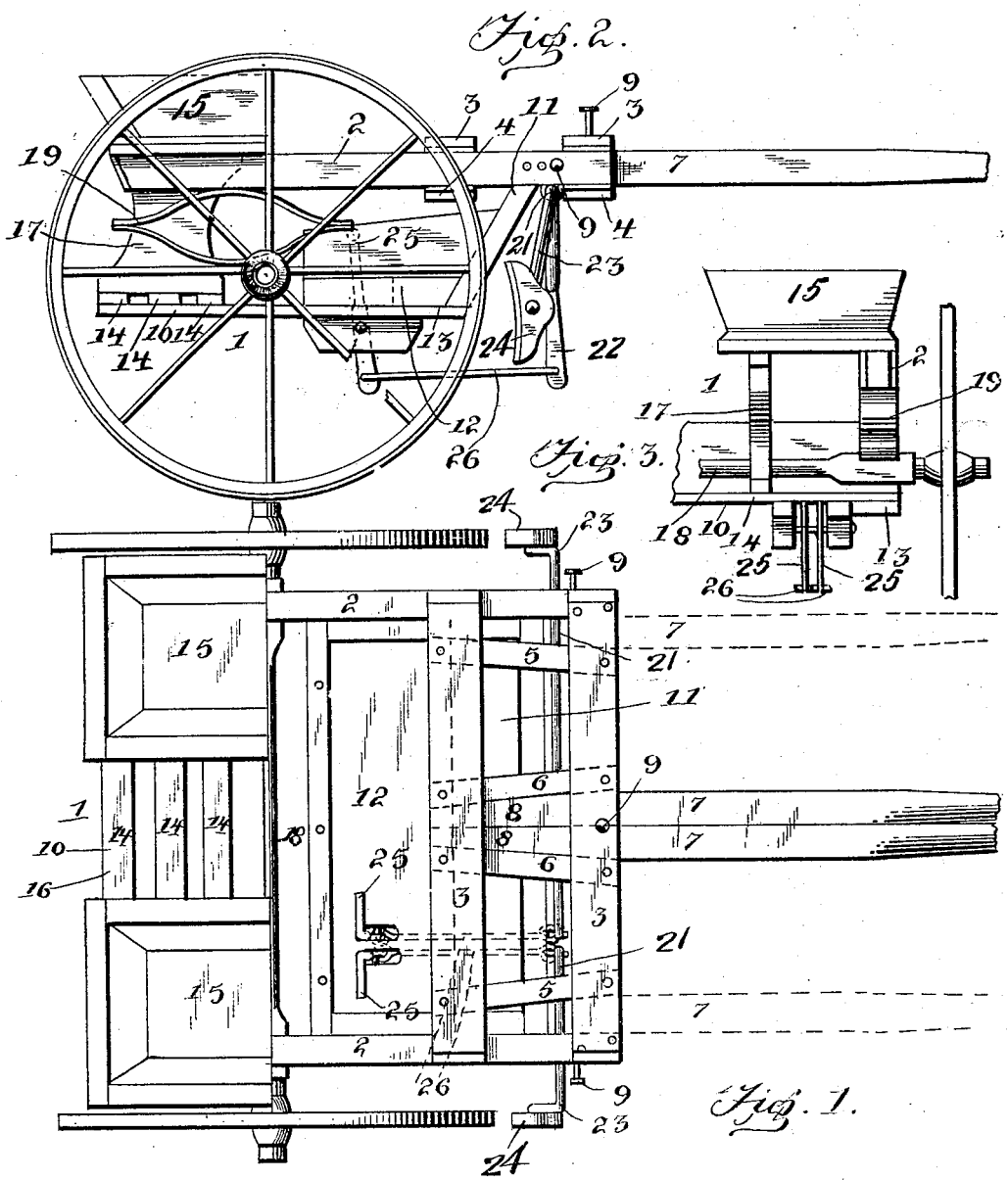

UNITED STATES PATENT OFFICE.

WILLIAM C. POOLE, OF MARYSVILLE, CALIFORNIA.

CART.

SPECIFICATION forming part of Letters Patent No. 774,105, dated November 1, 1904.

Application filed March 10, 1904. Serial No. 197,524. (No model.)

*To all whom it may concern:*

Be it known that I, WILLIAM C. POOLE, a citizen of the United States, residing at Marysville, in the county of Yuba and State of California, have invented certain new and useful Improvements in Carts; and I do declare the following to be a full, clear, and exact description of the invention, such as will enable others skilled in the art to which it appertains to make and use the same.

My invention is an improved cart; and it consists in the construction, combination, and arrangement of devices hereinafter described and claimed.

One object of my invention is to provide a vehicle with a novel form of pole comprising a pair of sections which are separable to form thills.

A further object of my invention is to effect improvements in the construction of the frame.

A further object of my invention is to effect improvements in the arrangement of the seats.

A further object of my invention is to provide independently-operated brake devices for the wheels on the opposite sides of the cart, so that a brake may be applied to either of the wheels at will.

In the accompanying drawings, Figure 1 is a top plan view of a cart embodying my improvements, showing the thills in dotted lines and showing them joined to form the pole in full lines. Fig. 2 is a side elevation of the same. Fig. 3 is a partial rear elevation showing one of the seats and its attachments.

In the construction of my improved cart I provide a frame 1, which has rearwardly-extending side bars or members 2. The same are here shown as having their front ends connected together by cross-bars 3 4, which are disposed, respectively, on their upper and lower sides, there being two pairs of the said cross-bars, one pair a suitable distance in rear of the other. Between the bars 3 4 are cleats 5 6, the former near the side bars 2 and the latter midway between them and appropriately spaced apart.

The bars 5 are disposed at a forwardly-widening angle with relation to the side bars 2, and the cleats 6 also diverge forwardly, as shown. Hence sockets are formed between the cross-bars 3 4 and the said bars 2 near the front corners of the frame, and a socket is also formed midway between the sides of the frame by the cleats 6 and the cross-bars 3 4. The pole and thills are convertible—that is to say, the pole comprises a pair of sections 7, which have their rear ends tapered, as at 8. When the said sections are in contact with each other and their rear ends are inserted in the socket between the cleats 6, they form the pole of the vehicle, as shown in full lines in Fig. 1, and when the said sections are separated and have their rear ends inserted in the sockets between the cleats 5 and the side bars 2 they form the thills of the vehicle, as shown in dotted lines in Fig. 1.

Pins 9 are provided to engage registering openings in the frame and in the sections 7 to secure them in either position. Any other suitable means may be employed to secure the said sections to the frame, and I do not desire to be understood as limiting myself in this particular.

Under the frame 1 and at a suitable distance therefrom is a floor-frame 10. The front end thereof extends upwardly, as at 11, and is attached to the under side of the frame 1 at a suitable distance from its front end. The upwardly-inclined front portion of the floor-frame may be a dashboard, as here shown. The floor-frame may be of any suitable construction within the scope of my invention. It is here shown as provided on its front portion with a foot-box 12, and the rear portions of its side bars 13 are here shown as connected together by a plurality of cross-slats 14.

The seats 15, of which there are a pair, are separated to form a space 16 between them at the center and rear end of the cart or vehicle. The said seats are secured on the rear ends of the side bars 2. They are also supported by standards or brackets 17, which rise from the floor-frame and are here shown as rising from the cross-slats 14 thereof. This disposition of the seats to form an open space between them at the rear side of the vehicle renders it very easy for a person to get into or out of the vehicle without risk of injury.

The axle 18 is here shown as disposed between the frame 1 and the floor-frame and is vertically movable independently thereof. It is here shown as connected to and suspended from the side bars of the frame 1 by springs 19.

Each of the wheels of the vehicle is provided with an independent brake device, which, within the scope of my invention, may be of any suitable construction. Each of the said brake devices is here shown as comprising a rock-shaft 21, mounted in bearings on the under side of the frame 1 at the front end thereof, an arm 22, which depends from the inner end of said rock-shaft, and a crank-arm 23, which depends from the outer end thereof and is provided with a brake-shoe 24. Each of the brake devices is provided with a foot-lever 25, the upper end of which extends upwardly into the foot-box 12, the lower ends of the said brake-levers being connected to the arms 22 of the brake devices by means of rods 26.

It will be understood that the brake devices are entirely independent of each other, so that one may be applied to a wheel without affecting the other. This enables side draft to be imposed upon an unruly horse, so as to compel him to move in a circle and prevent him from running away.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim as new, and desire to secure by Letters Patent, is—

A cart having an upper frame comprising side bars, cross-bars in pairs on the upper and lower sides of the side bars, said pairs of cross-bars being spaced apart, cleats 5 between the cross-bars and near the side bars to form side sockets, cleats 6 between the cross-bars, appropriately spaced apart to form a center socket, said side and center sockets being respectively adapted for the reception of the rear ends of thills and a pole, a floor-frame below and having its front end connected to the upper frame, seats, spaced apart and having their outer sides attached to the side bars of the upper frame, standards connecting the inner sides of the seats to the floor-frame, springs secured to and depending from the side bars, and an axle, free to move vertically between the upper frame and the floor-frame and secured to the said springs, substantially as described.

In testimony whereof I have hereunto set my hand in presence of two subscribing witnesses.

WILLIAM C. POOLE.

Witnesses:
JESSE R. RATHBURN,
GEO. W. GREENE.